(12) United States Patent
Lavieville

(10) Patent No.: US 9,735,664 B2
(45) Date of Patent: Aug. 15, 2017

(54) CASCADED MULTI-LEVEL POWER CONVERTER

(71) Applicant: Schneider Toshiba Inverter Europe SAS, Pacy-sur-Eure (FR)

(72) Inventor: Jean-Paul Lavieville, Saint Lambert des Bois (FR)

(73) Assignee: SCHNEIDER TOSHIBA INVERTER EUROPE SAS, Pacy sur Eure (FR)

( * ) Notice: Subject to any disclaimer, the term of this patent is extended or adjusted under 35 U.S.C. 154(b) by 0 days.

(21) Appl. No.: 14/654,664

(22) PCT Filed: Jan. 16, 2014

(86) PCT No.: PCT/EP2014/050802
§ 371 (c)(1),
(2) Date: Jun. 22, 2015

(87) PCT Pub. No.: WO2014/118010
PCT Pub. Date: Aug. 7, 2014

(65) Prior Publication Data
US 2015/0311776 A1    Oct. 29, 2015

(30) Foreign Application Priority Data
Jan. 29, 2013 (FR) .................................. 13 50713

(51) Int. Cl.
*H02M 7/483* (2007.01)
*H02M 7/487* (2007.01)
(Continued)

(52) U.S. Cl.
CPC ............. *H02M 1/08* (2013.01); *H02M 7/483* (2013.01); *H02M 7/487* (2013.01); *H02M 2001/007* (2013.01)

(58) Field of Classification Search
CPC ............ H02M 7/42; H02M 7/44; H02M 7/48; H02M 7/483; H02M 7/487; H02M 7/49;
(Continued)

(56) References Cited

U.S. PATENT DOCUMENTS 658,924 A * 10/1900 Gateau ................. H01H 31/127
                                                          337/156
5,625,545 A    4/1997  Hammond
(Continued)

FOREIGN PATENT DOCUMENTS

CH    DE 102005044639 A1 *  3/2007  ............ H02J 3/1857
CH    DE 102005044641 A1 *  3/2007  ............ H02J 3/1857
(Continued)

OTHER PUBLICATIONS

"Neutral point control in multi level converters applying novel modulation schemes," Power Electronics Specialists Conference, 2006. PESC '06. 37th IEEE, Jeju, 2006, pp. 1-8.*
(Continued)

*Primary Examiner* — Gary L Laxton
*Assistant Examiner* — Ivan Laboy Andino
(74) *Attorney, Agent, or Firm* — Oblon, McClelland, Maier & Neustadt, L.L.P.

(57) ABSTRACT

A multi-level power converter comprising: n input stages ($E_{in\_n}$), n being at least equal to 1, each input stage comprising n+1 identical input converters ($CONV_{x\_En}$) connected together, the input converters ($CONV_{x\_En}$) exhibiting an identical topology, chosen from among the architectures of the NPC (Neutral Point Clamped), ANPC (Active Neutral Point Clamped), NPP (Neutral Point Piloted) and SMC (Stacked Multicell Converter); an output stage ($E_{out}$) connected to the input stage of rank 1 and comprising an output converter ($CONV_s$) supplied with a differential voltage ($V_{float}$) resulting from a first electrical
(Continued)

potential applied to the output of a first input converter of the input stage of rank 1 and from a second electrical potential applied to the output of a second input converter of the input stage of rank 1, the output converter (CONVs) exhibiting a topology chosen from among an architecture with floating capacitor (FC), SMC (Stacked Multicell Converter), NPC (Neutral Point Clamped), NPP (Neutral Point Piloted) and ANPC (Active Neutral Point Clamped).

7 Claims, 8 Drawing Sheets

(51) Int. Cl.
*H02M 1/08* (2006.01)
*H02M 1/00* (2006.01)

(58) Field of Classification Search
CPC ...... H02M 7/537; H02M 7/5387; H02M 1/08; H02M 1/34; H02M 2001/007; H02M 2001/342; H02M 2001/344; H02M 2001/346; H02M 2001/348; H02M 7/4826; H02M 2007/4835; H02M 7/5388; H02J 3/36
USPC ...... 363/16–17, 37–43, 52–55, 56.01–56.02, 363/65, 71, 84, 89, 95–98, 123, 125, 363/131–132, 135–136; 307/82
See application file for complete search history.

(56) References Cited

U.S. PATENT DOCUMENTS

| | | | |
|---|---|---|---|
| 6,519,169 B1* | 2/2003 | Asplund | H02M 7/48 363/132 |
| 6,930,899 B2 | 8/2005 | Bakran et al. | |
| 8,488,336 B2* | 7/2013 | Lacarnoy | H02M 7/483 363/132 |
| 2004/0127612 A1 | 7/2004 | Baran, Jr. et al. | |
| 2006/0002843 A1 | 1/2006 | Baran, Jr. et al. | |
| 2007/0025126 A1* | 2/2007 | Barbosa | H02M 7/483 363/60 |
| 2007/0235293 A1* | 10/2007 | Steimer | H02M 7/49 200/2 |
| 2011/0002148 A1* | 1/2011 | Iturriz | H02M 7/10 363/126 |
| 2013/0088901 A1* | 4/2013 | Bleus | H02M 7/487 363/71 |
| 2013/0249322 A1* | 9/2013 | Zhang | H02M 7/483 307/151 |
| 2013/0314957 A1* | 11/2013 | Gupta | H02M 7/483 363/71 |

FOREIGN PATENT DOCUMENTS

| | | | | |
|---|---|---|---|---|
| CH | WO 2007033501 A1 * | 3/2007 | ............ | H02J 3/1842 |
| CH | WO 2007033502 A1 * | 3/2007 | ............ | H02J 3/1842 |
| EP | 1 587 609 | 3/2007 | | |
| JP | 2012253927 A * | 12/2012 | ............ | H02M 7/487 |
| WO | WO 2004060543 A2 | 7/2004 | | |

OTHER PUBLICATIONS

International Search Report issued Jan. 20, 2015, in PCT/EP2014/050802, filed Jan. 16, 2014.
Fang Zheng Peng, "A Generalized Multilevel Inverter Topology with Self Voltage Balancing", IEEE Transactions on Industry Applications, vol. 37, No. 2, Mar. 1, 2001, pp. 611-618, XP011022945.
Zhiguo Pan, et al., "A diode-clamped multilevel converter with reduced number of clamping diodes", 2004 IEEE Applied Power Electronics Conference and Exposition, APEC 04, IEEE, vol. 2, Feb. 22, 2004, pp. 820-824, XP010703326.
Allan Chen, et al., "A novel type of combined multilevel converter topologies", Industrial Electronics Society, 2004, IECON 2004, 30th Annual Conference of IEEE, vol. 3, Nov. 2, 2004, pp. 2290-2294, XP010799316.
Allan Chen, et al., "A multilevel converter topology with fault tolerant ability", 2004 IEEE Applied Power Electronics Conference and Exposition, APEC 04, IEEE, vol. 3, Feb. 22, 2004, pp. 1610-1616, XP010703838.
Peter Barbosa, et al., "Active-Neutral-Point-Clamped (ANPC) Multilevel Converter Technology", Power Electronics and Applications, 2005 European Conference on Dresden, Sep. 11, 2005 (Sep. 11, 2005), pp. P.1-P.10, XP010933291.

* cited by examiner

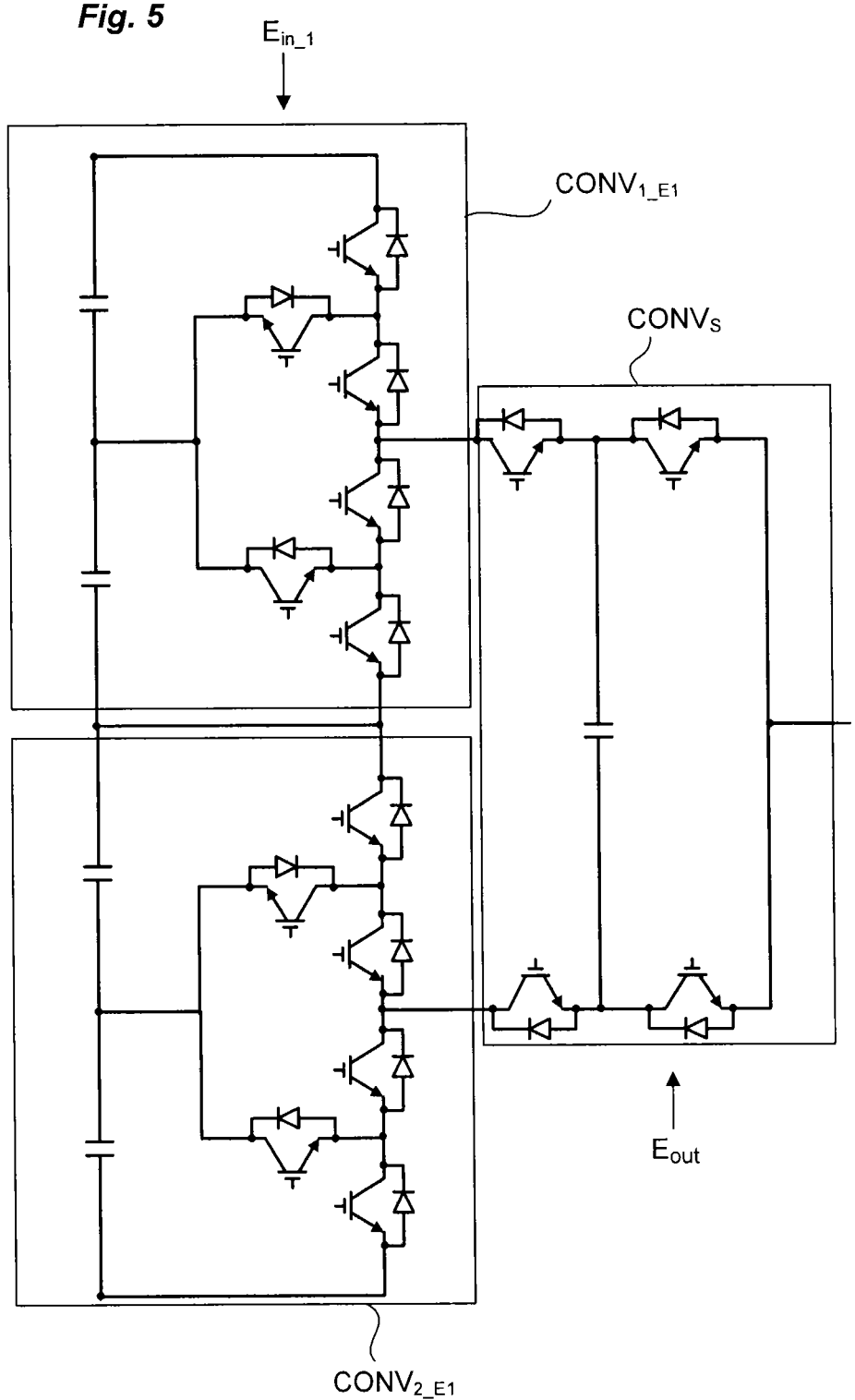

CASCADED MULTI-LEVEL POWER CONVERTER

TECHNICAL FIELD OF THE INVENTION

The present invention relates to a multilevel power converter. The multilevel converter of the invention is more particularly intended to operate in the medium-voltage range.

PRIOR ART

Some applications today require very high voltages. Even if the performance levels of the semiconductors used in power converters are continuously improved, their voltage withstand is nevertheless not yet sufficient to be able to propose compact and safe power converters. Therefore, various solutions have been developed to allow a voltage increase while complying with the voltage withstands of the components.

A first solution simply involves linking switches in series. However, it is difficult to distribute the voltage constraints evenly over each of the switches, either in a static system or in a dynamic system. By way of example, on turning on, the switch with the slowest switching risks being subjected to excessive transient voltage, while on turning off, the fastest switch risks being destroyed. In order to cope with these difficulties, other solutions have been proposed, based on interlacing of the controls for the switches. These solutions allow a plurality of voltage levels to be proposed with the aim of restoring the waveforms.

A second solution that has emerged is what is known as the NPC (Neutral Point Clamped) topology. This topology provides significant improvements for the problem of balancing the voltages to which the switches are subject and allows satisfactory waveforms to be generated. However, this topology has limitations on its use and disadvantages related notably to the balancing of the voltage on the bus capacitors. This NPC-type topology has therefore been improved by replacing the diodes with controlled switches. The improved topology is called ANPC (Active Neutral Point Clamped) and has already been implemented in some products (ACS 2000 from the ABB company). An alternative to the NPC topology, called NPP (Neutral Point Piloted), has been described in the patent U.S. Pat. No. 6,930,899, for example.

A third solution has emerged, using nested cells. The nested-cell converter allows a voltage source to be connected to a current source by linking any number of switches in series, whatever the type of conversion required. Each elemental cell has two switches and a capacitor. However, this solution likewise has disadvantages related to the presence of the flying capacitors in each cell, the number of which gives rise to additional cost and a large quantity of stored energy.

In order to reduce the size of the capacitors and the energy stored in the converter, a fourth solution has been proposed. This solution is called stacked multicell converter (SMC). This solution, which is described in the patent EP1287609, involves linking a plurality of nested-cell converters.

Finally, a last solution has been described in the patent US5625545. This solution involves linking the output of the cells in series and supplying power to each cell using an independent source. Each cell has a rectifier and an inverter. The outputs of the cells are linked in series in order to generate the desired voltage level on the load. A time shift in the controls for the inverters is used to obtain a multilevel voltage.

Solutions have moreover been described in the following documents:

FANG ZHENG: "A Generalized Multilevel Inverter Topology with Self Voltage Balancing"—1 Mar. 2001, XP011022945

ZHIGUO PAN ET AL: "A diode-clamped multilevel converter with reduced number of clamping diodes"—22 Feb. 2004, XP010703326

ALIAN CHEN ET AL: "A novel type of combined multilevel converter topologies"—2 Dec. 2004, XP010799316

ALIAN CHEN ET AL: "A multilevel converter topology with fault tolerant ability"—22 Feb. 2004, XP010703838

BARBOSA P ET AL: "Active-Neutral-point-Clamped (ANPC) Multilevel Converter Technology", XP010933291

US2007/025126A1

The solutions described in these documents propose cascading converters, all with identical topology.

The aim of the invention is to propose an alternative solution to all of the earlier solutions, allowing a large number of components to be linked in order to be able to operate at high voltage levels, without using a transformer and limiting the maximum number of passive components.

SUMMARY OF THE INVENTION

This aim is achieved by a multilevel power converter comprising:

n input stages, n being at least equal to 1, each input stage having n+1 identical input converters that are connected to one another, each converter being supplied with an input voltage and controlled to apply an electrical potential to an output on the basis of said input voltage, if n is greater than or equal to 2, each input converter of the input stage of rank n−1 being supplied with the voltage resulting from the electrical potentials applied to two outputs by two converters of rank n, an output stage connected to the input stage of rank 1 and having an output converter supplied with a differential voltage resulting from a first electrical potential applied to the output of a first input converter of the input stage of rank 1 and from a second electrical potential applied to the output of a second input converter of the input stage of rank 1, said output converter being controlled to apply an electrical potential to an output, the input converters exhibiting an identical topology, chosen from among the architectures of NPC, ANPC, NPP and SMC type, the output converter exhibiting a different topology than the topology chosen for the input converters, said topology of the output converter being chosen from among a flying capacitor, SMC, NPC, NPP and ANPC architecture.

According to one variant embodiment, the input converters exhibit a topology of NPP type and the output converter exhibits a flying capacitor topology.

According to another variant embodiment, the input converters exhibit a topology of NPC type and the output converter exhibits a flying capacitor topology.

According to another variant embodiment, the input converters exhibit a topology of ANPC type and the output converter exhibits a flying capacitor topology.

According to another variant embodiment, the input converters exhibit a topology of NPP type and the output converter exhibits a topology of SMC type.

According to another variant embodiment, the input converters exhibit a topology of NPC type and the output converter exhibits a topology of SMC type. According to another variant embodiment, the input converters exhibit a topology of ANPC type and the output converter exhibits a topology of SMC type.

BRIEF DESCRIPTION OF THE FIGURES

Other features and advantages will emerge in the detailed description that follows with reference to the appended drawings listed below:

FIG. 5 shows the multilevel converter of the invention, having an input stage with ANPC topology and an output stage with flying capacitor topology at the output.

DETAILED DESCRIPTION OF AT LEAST ONE EMBODIMENT

The invention concerns a multilevel power converter allowing operation at high voltages, more precisely in the medium-voltage range from 2.3 kV to 13.8 kV. It is dependent on elemental structures being linked in cascaded fashion, each elemental structure being based on a limited quantity of components being linked in series.

Figure 1:
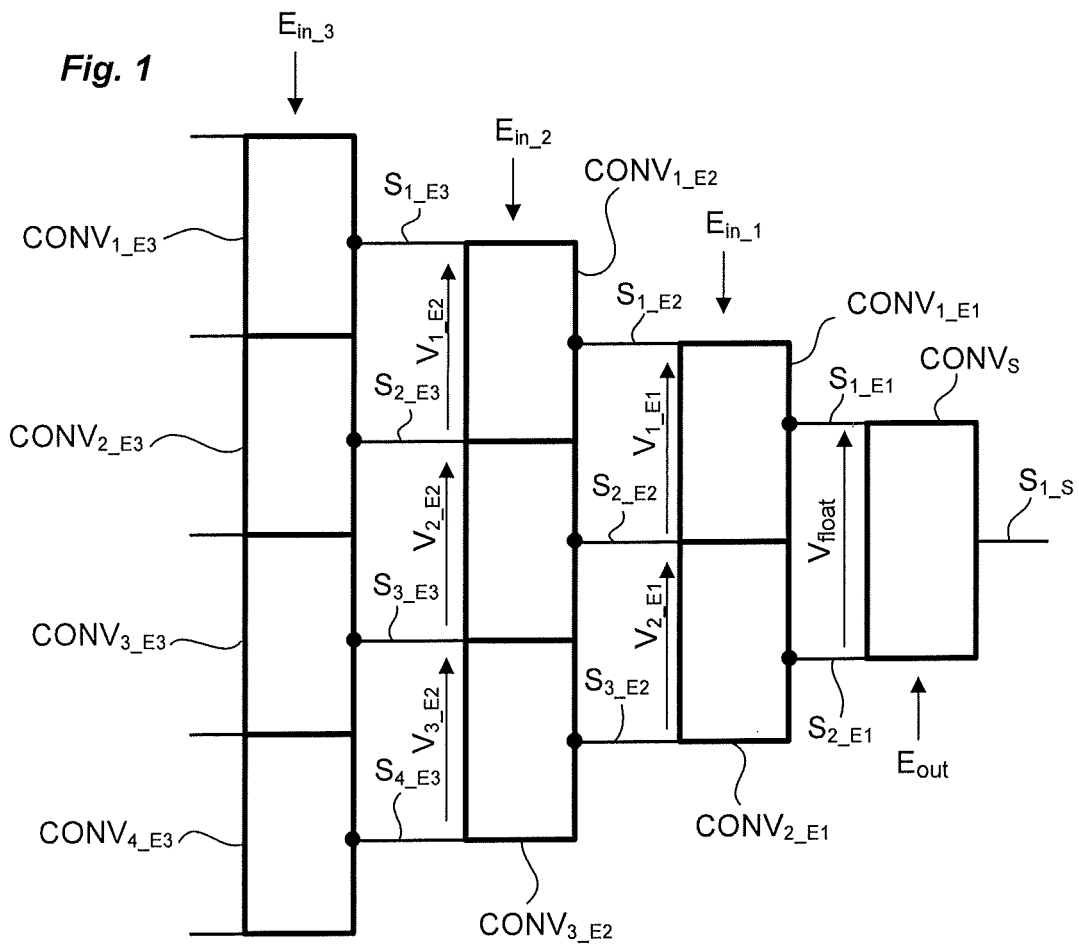
FIG. 1 schematically shows the multilevel power converter of the invention.
Figure 2:
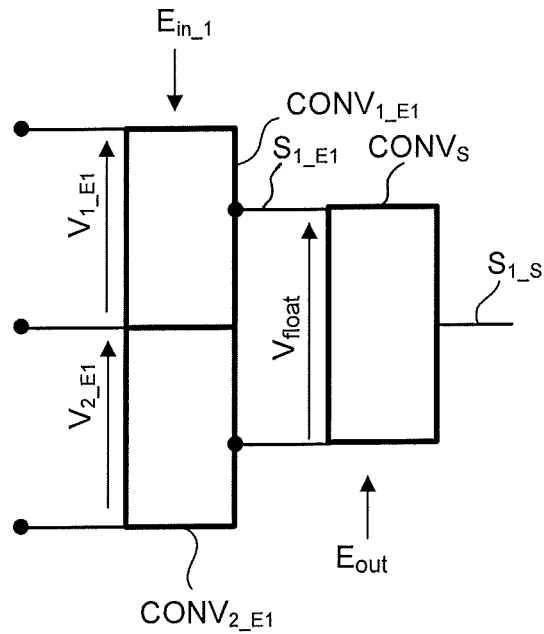
FIG. 2 shows the multilevel converter of the invention comprising a single input stage and an output stage.

With reference to FIG. 1, the multilevel converter of the invention thus has:

n input stages $E_{in\_n}$, n being at least equal to 1, each input stage $E_{in\_n}$ having n+1 identical input converters $CONV_{x\_En}$ (x ranging from 1 to n+1) that are connected to one another, each converter $CONV_{x\_En}$ being supplied with an input voltage $V_{x\_En}$ and controlled to apply an electrical potential to an output $S_{y\_En}$ (y ranging from 1 to n) on the basis of said input voltage, if n is greater than or equal to 2, each input converter of the input stage of rank n−1 being supplied with the voltage resulting from the electrical potentials applied to two outputs by two converters of rank n, an output stage $E_{out}$ connected to the input stage of rank 1 and having an output converter $CONV_S$ supplied with a differential voltage $V_{float}$ resulting from a first electrical potential applied to the output of a first input converter of the input stage of rank 1 and from a second electrical potential applied to the output of a second input converter of the input stage of rank 1. The output converter is controlled to apply an electrical potential to its output $S_{1\_S}$.

According to the invention, the input converters exhibit an identical topology. Said topology is chosen from among the architectures of NPC (Neutral Point Clamped), ANPC (Active Neutral Point Clamped), NPP (Neutral Point Piloted) and SMC (Stacked Multicell Converter) type.

According to the invention, the output converter exhibits a different topology than the topology chosen for the input converters and is chosen from among a flying capacitor (FC), SMC, NPC, NPP and ANPC architecture.

In the remainder of the description, for reasons of simplification, we will concern ourselves with a basic architecture that satisfies the criteria defined above and has a single input stage $E_{in\_1}$ and an output stage $E_{out}$. This basic architecture thus has:

A first input converter $CONV_{1\_E1}$ whose input is supplied with a first voltage $V_{1\_E1}$ and that is controlled to apply a first electrical potential to a first output $S_{1\_E1}$, A second input converter $CONV_{2\_E1}$ whose input is supplied with a second voltage $V_{2\_E1}$ and that is controlled to apply a second electrical potential to a second output $S_{2\_E1}$, An output converter $CONV_S$ that is connected to the first output $S_{1\_E1}$ and to the second output $S_{2\_E1}$ so as to be supplied with a differential voltage $V_{float}$ resulting from the first electrical potential and from the second electrical potential and controlled to apply an electrical potential to an output $S_{1\_S}$.

Figure 3:
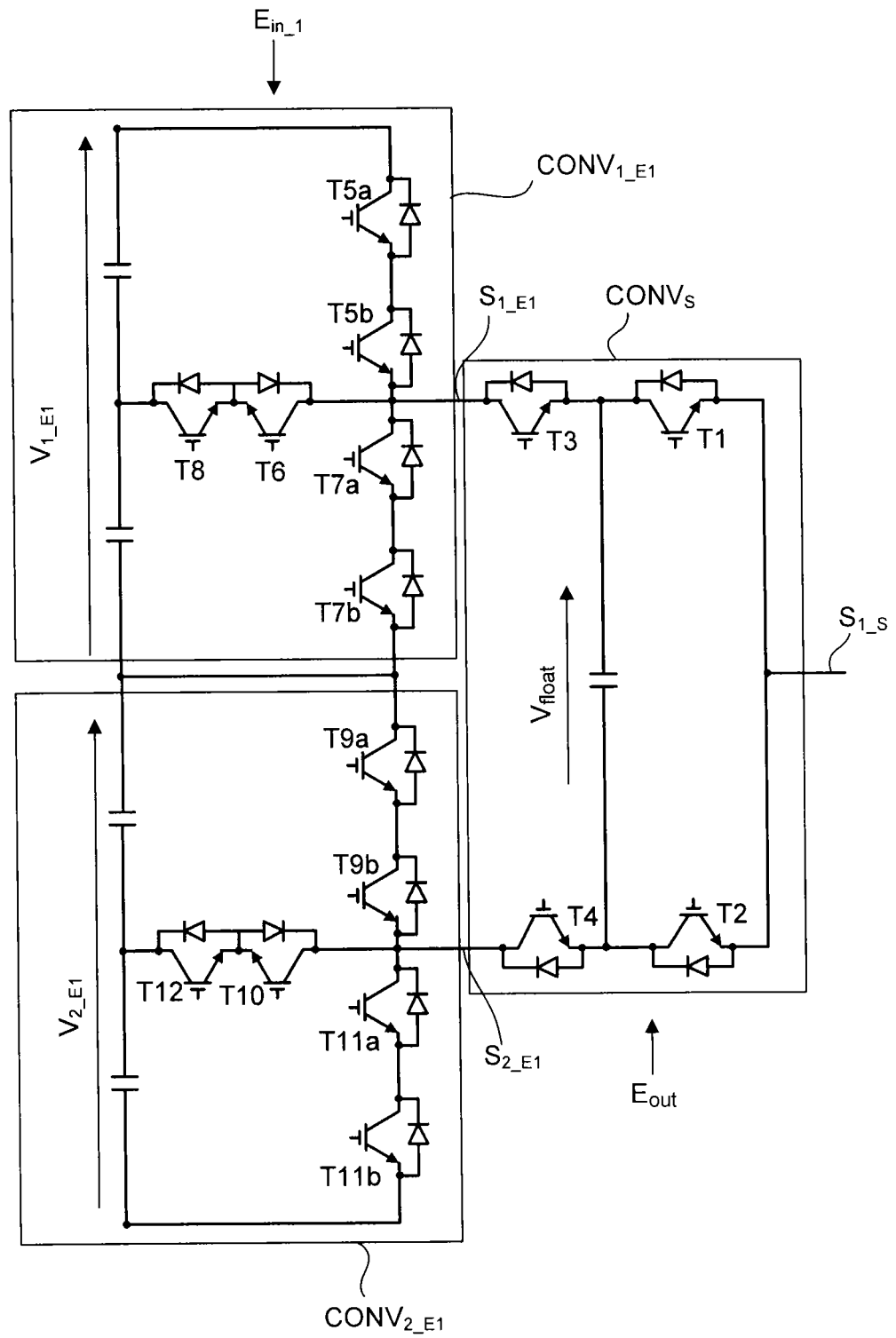
FIG. 3 shows the multilevel converter of the invention, having an input stage with NPP topology and an output stage with flying capacitor topology.
Figure 4:
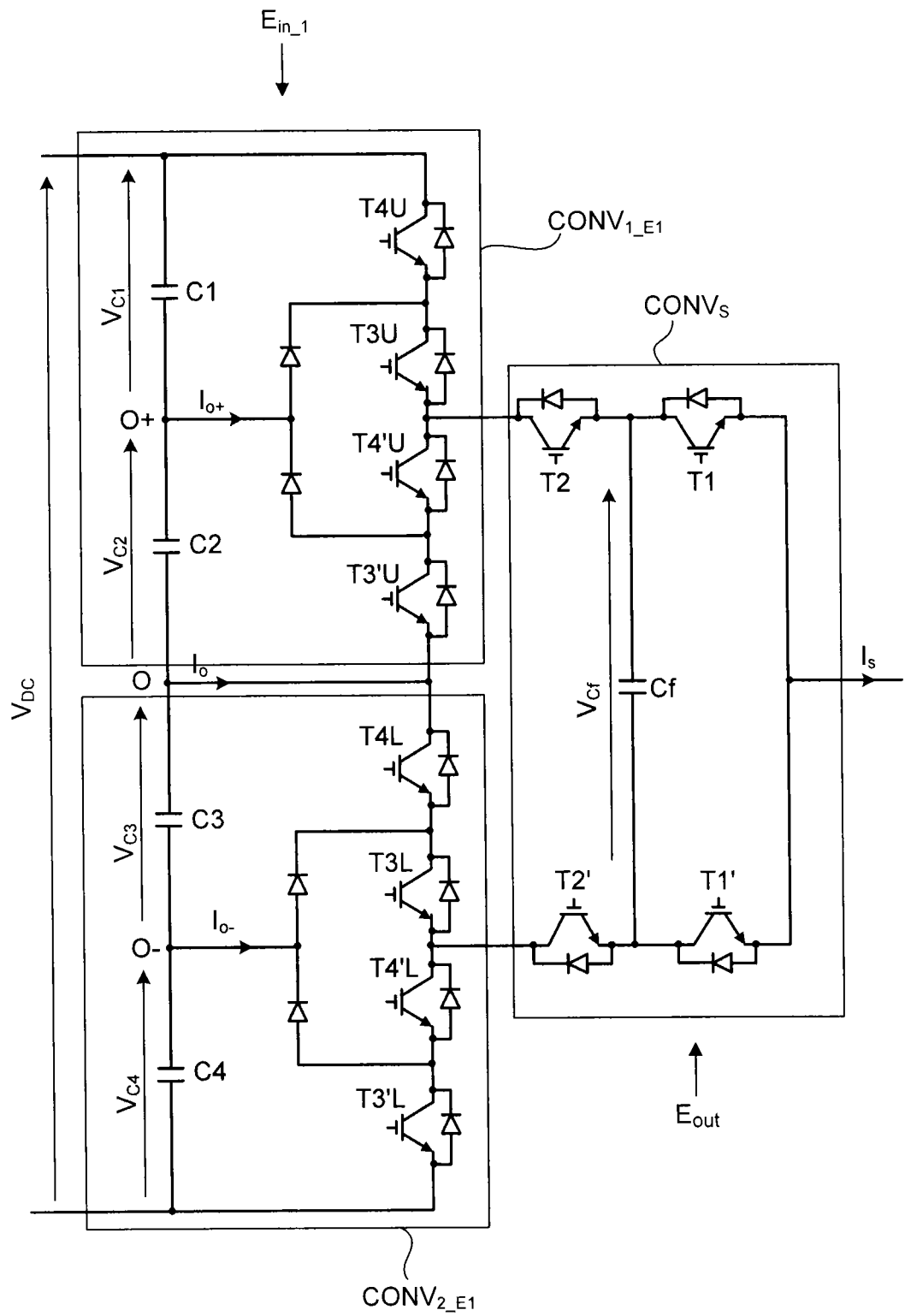
FIG. 4 shows the multilevel converter of the invention, having an input stage with NPC topology and an output stage with flying capacitor topology.
Figure 6A:
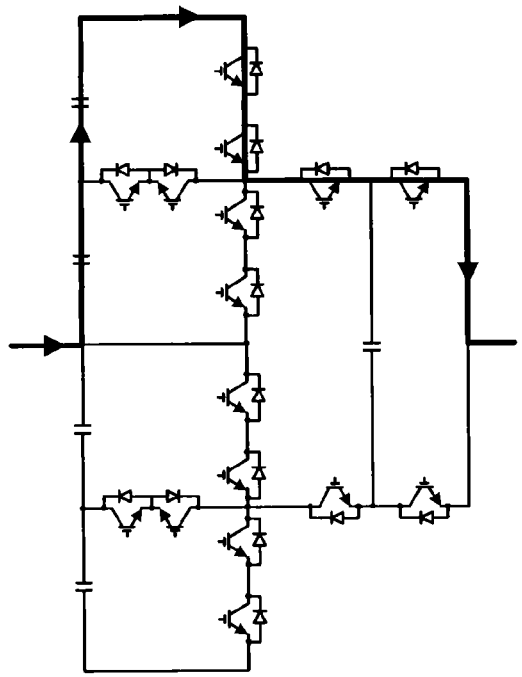
FIGS. 6A to 6L illustrate the various flow sequences for the current in a multilevel converter of the invention, having an input stage with NPP topology and an output stage with flying capacitor topology.
Figure 6B:
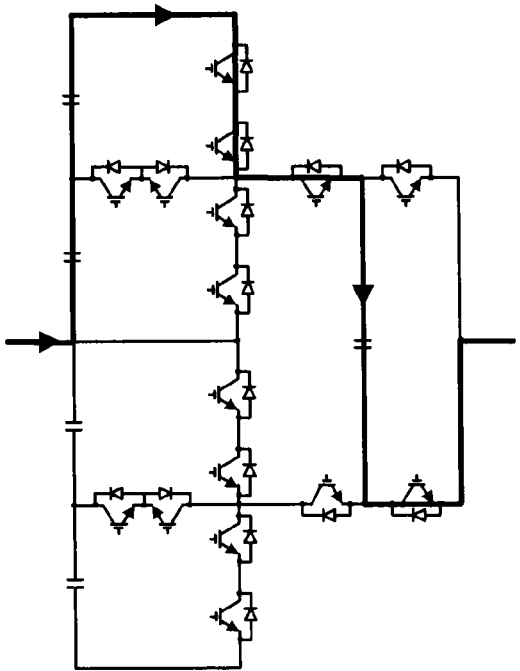
Figure 6C:
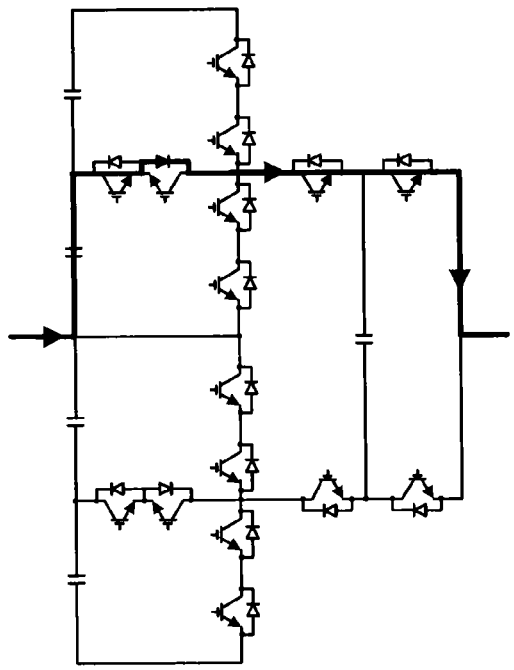
Figure 6D:
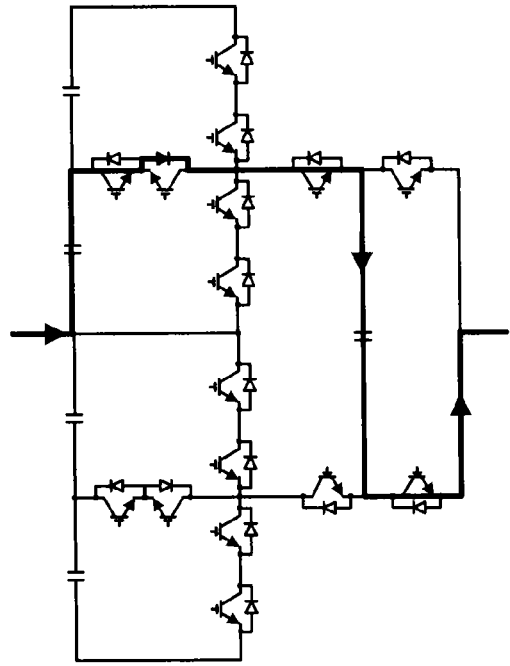
Figure 6E:
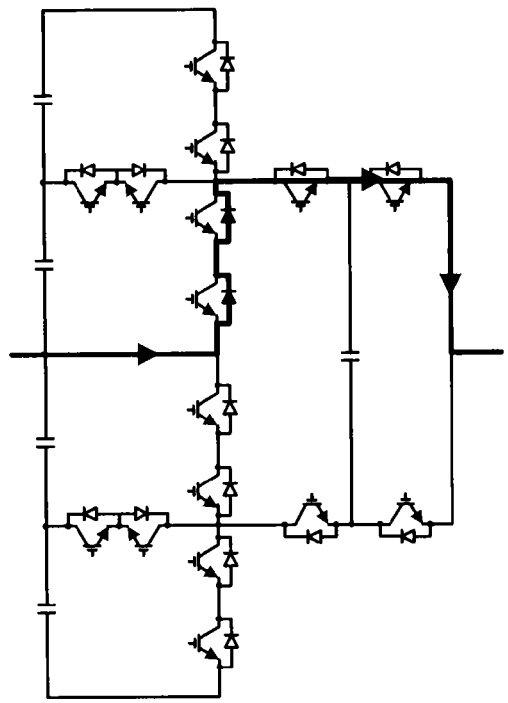
Figure 6F:
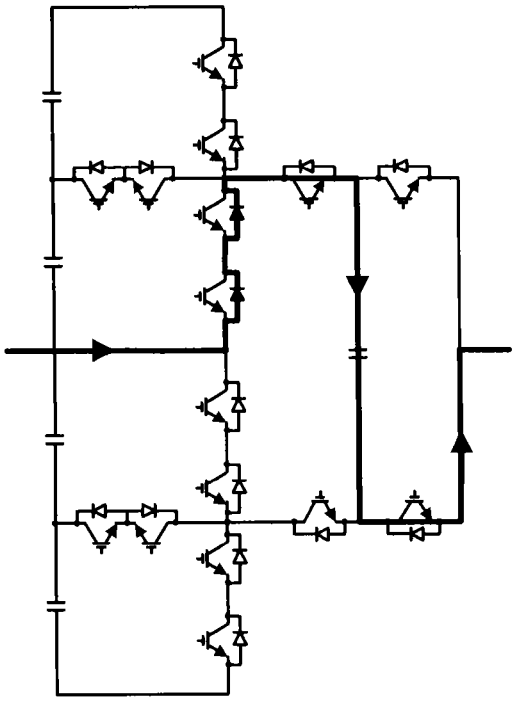
Figure 6G:
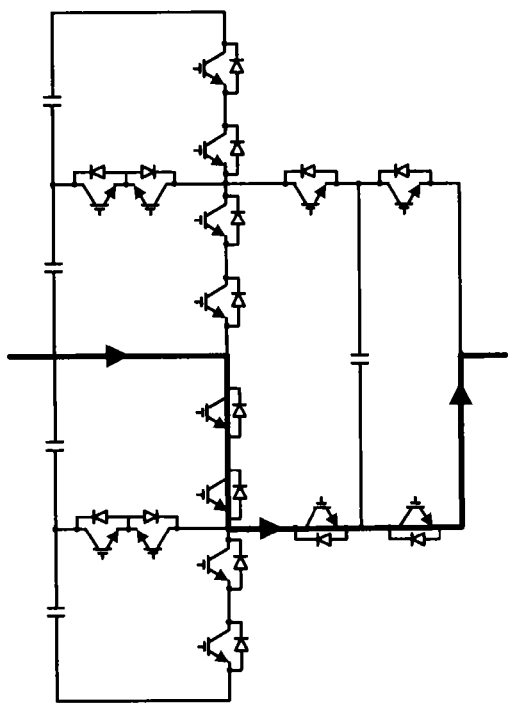
Figure 6H:
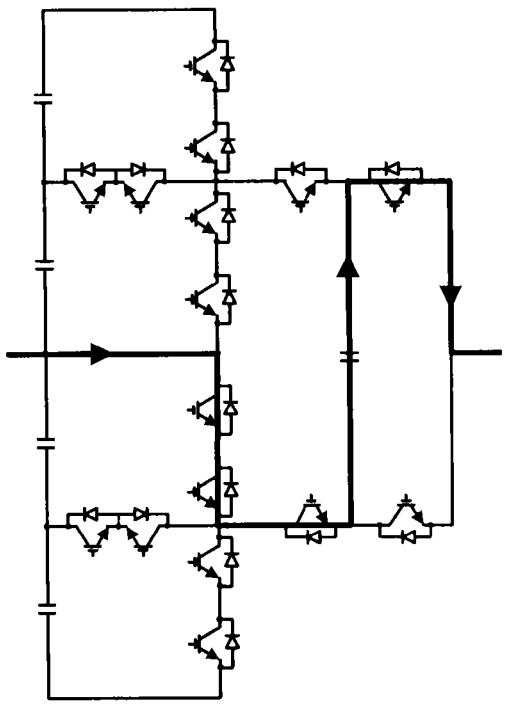
Figure 6I:
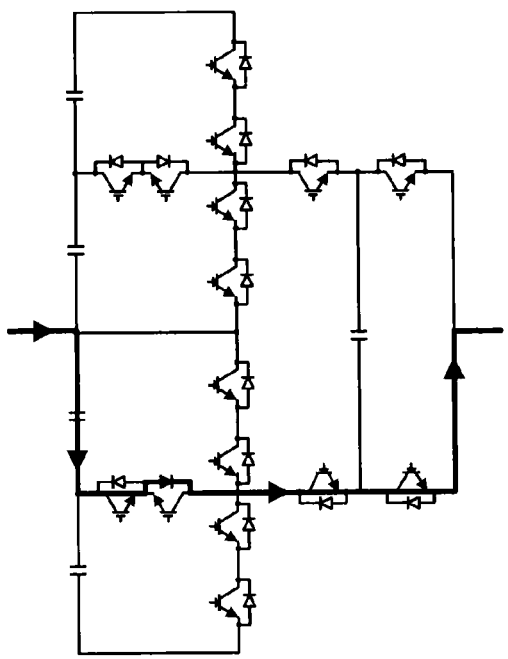
Figure 6J:
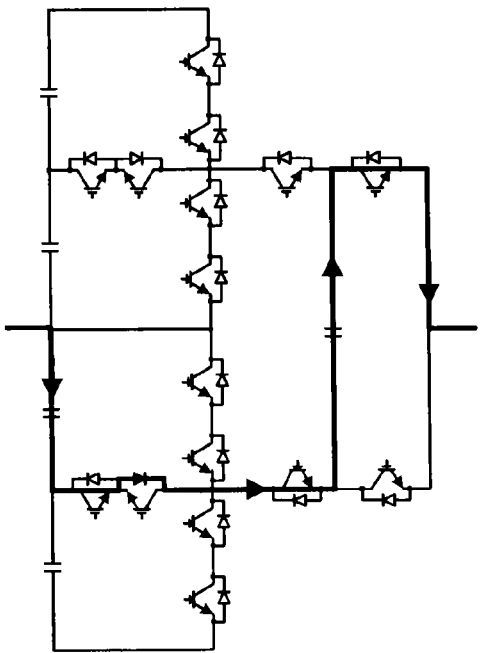
Figure 6K:
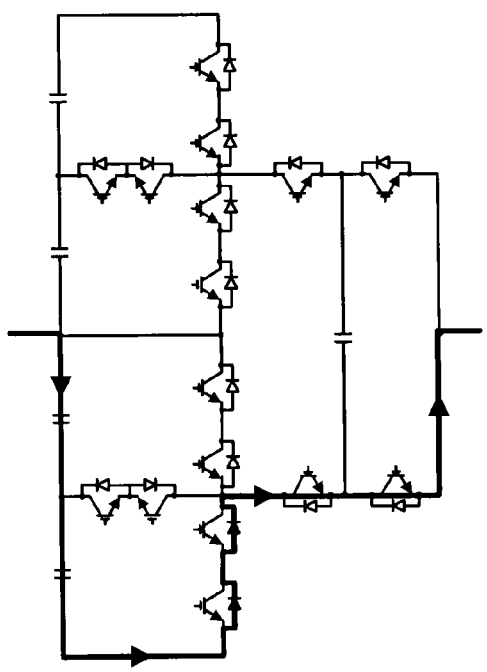
Figure 6L:
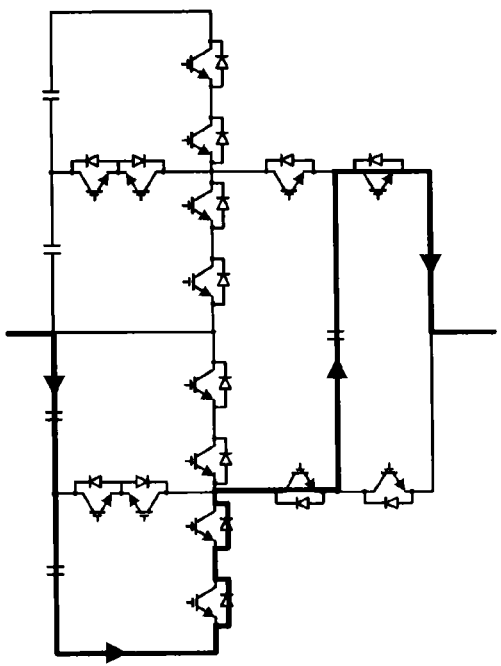

With reference to FIGS. 3 to 5, a first proposal is described below.

In the input stage $E_{in\_1}$, the input converters $CONV_{1\_E1}$, $CONV_{2\_E1}$ are provided using simple topologies, for example, linking two switches in series. In these solutions, the differential voltage $V_{float}$ is equal to the voltage V (=$V_{1\_E1}$=$V_{2\_E1}$), or to half of the total input voltage ($V_{1\_E1}$+$V_{2\_E}$). Each of the input switches must therefore withstand half of the input voltage.

In the output stage, the converter is chosen so as to use the same switches as those in the input stage and so as to limit the number of switches to this stage.

Various architectures satisfying these criteria are shown in FIGS. 3 to 8.

FIG. 3 thus shows a multilevel converter of the type from the invention comprising input converters $CONV_{1\_E1}$, $CONV_{2\_E1}$ having an NPP topology and an output converter $CONV_S$ having a topology of flying capacitor type.

FIG. 4 thus shows a multilevel converter of the type from the invention comprising input converters $CONV_{1\_E1}$, $CONV_{2\_E1}$ having an NPC topology and an output converter $CONV_S$ having a topology of flying capacitor type.

FIG. 5 thus shows a multilevel converter of the type from the invention comprising input converters $CONV_{1\_E1}$, $CONV_{2\_E1}$ having an ANPC topology and an output converter CONVs having a topology of flying capacitor type.

FIGS. 6A to 6L more particularly illustrate the operating sequences of the architecture having an NPP topology for the input converters and a flying capacitor topology for the output converter.

For the output stage, certain rules need to be observed:
The transistors T1 and T2 have complementary operation apart from the dead time.
The transistors T3 and T4 have complementary operation apart from the dead time.
In order to maintain the constancy of the average voltage at the terminals of the flying capacitor $C_{float}$, the controls for the transistors T1 and T3, or T2 and T4, are identical apart from being out of phase, which would allow the load current to pass through said capacitor transiently.

By way of example, the control of the switches of the output stage is based on intersective modulation with N triangular carriers, shifted in time (ideally by 2π/n), at the switching frequency corresponding to the n cells (in this case N is thus equal to 2) of this stage and a sinusoidal modulant at the frequency of the output signal in order to determine the switching times of the switches.

For the input stage, certain rules need to be observed:

The transistors (T5a, T5b), (T7a, T7b), (T9a, T9b), (T11a, T11b) are linked in pairs so that their switching is simultaneous.

The simultaneous control of T5 and T6 is prohibited. These switches have complementary operation apart from the dead time.

The simultaneous control of T5 and T7 is prohibited. These switches have complementary operation apart from the dead time.

The simultaneous control of T7 and T11 is prohibited. These switches have complementary operation apart from the dead time.

The simultaneous control of T7 and T8 is prohibited. These switches have complementary operation apart from the dead time.

The simultaneous control of T9 and T10 is prohibited. These switches have complementary operation apart from the dead time.

The simultaneous control of T11 and T12 is prohibited. These switches have complementary operation apart from the dead time.

The simultaneous control of T9 and T11 is prohibited. These switches have complementary operation apart from the dead time.

Complementary signals are used to control the switches T7 and T9, these signals themselves being complementary with the control signals for the switches T8 and T10. These signals are dependent on the sign of the setpoint voltage.

Control of the switches T5, T6, T11 and T12 uses two triangular carriers, for example, that are amplitude-shifted and out of phase in relation to the carriers used for controlling the switches of the output stage, this being in order to limit the harmonic content of the output voltage.

Observing the rules defined above, the various operating sequences are illustrated in FIGS. 6A to 6L. Each figure shows a different path for the current through the input stage and the output stage.

These operating rules are perfectly suited when the voltages on the terminals of the capacitors are balanced. However, if it is necessary to balance these voltages, this must be done. A control example is thus described below.

In connection with the topology presented in FIG. 4, we will describe below a principle for balancing voltages on the terminals of the capacitors of a multilevel converter of the invention.

In FIG. 4, the multilevel converter of the invention has a plurality of switching cells. Each switching cell is formed by two switches (T1, T1'-T2, T2'-T3U, T3'U-T3L, T3'L-T4U, T4'U-T4L, T4'L) that have complementary operation, that is to say that when one is on the other is off.

A switching function $f_k$ is used to describe the operation of each cell.

If $f_k=1$, this means that the switch Tk is closed and that the switch T'k is open.

If $f_k=0$, this means that the switch Tk of the cell is open and that the switch T'k is closed.

In a topology such as that of a multilevel converter having the topology in FIG. 4, the input voltage needs to be evenly distributed between the input capacitors C1, C2, C3, C4, and, in order to ensure good distribution of the voltages between the switches, the voltage of the capacitor Cf needs to be equal to one quarter of the input voltage.

The switching cells are controlled in order to meet the following three objectives:

Obtaining the desired output voltage,

Balancing the voltage $V_{Cf}$ on the terminals of the flying capacitor Cf,

Balancing the voltage Vdc of the DC bus formed by the capacitors C1, C2, C3 and C4.

Balancing the Voltage $V_{Cf}$

The voltage $V_{Cf}$ on the terminals of the flying capacitor Cf is modified by the flow of current therein. The table below shows, in accordance with the states of the switches, the value of the output current passing through the flying capacitor:

| State | f4U f4L | f3U f3L | f2 | f1 | Phase voltage | Cf |
|---|---|---|---|---|---|---|
| V1 | 0 | 0 | 0 | 1 | −Vdc/4 | −Is |
| V2 | 0 | 0 | 1 | 0 | −Vdc/4 | Is |
| V5 | 0 | 1 | 0 | 1 | 0 | −Is |
| V6 | 0 | 1 | 1 | 0 | 0 | Is |
| V9 | 1 | 1 | 0 | 1 | Vdc/4 | −Is |
| V10 | 1 | 1 | 1 | 0 | Vdc/4 | Is |

In the other states taken by the switches, the flying capacitor Cf does not carry any current, its voltage therefore cannot change and balancing is thus not necessary, or possible.

In summary, if a voltage with a value of −Vdc/4 is required at the output, the control unit for the switches chooses between the states V1 and V2, taking account of the change in the voltage $V_{Cf}$ on the terminals of the flying capacitor. In order to obtain a zero output voltage, the control unit needs to choose between the states V5 and V6 in the table above according to the state of the voltage $V_{Cf}$ on the terminals of the flying capacitor.

In order to obtain an output voltage of Vdc/4, the control unit needs to choose between the states V9 and V10 in the table above according to the state of the voltage $V_{Cf}$ on the terminals of the flying capacitor.

Balancing the Voltage Vdc of the DC Bus

As far as balancing the voltage Vdc of the DC bus is concerned, it is known that the mid-point O exhibits a floating potential fixed at an average value but that this potential fluctuates around this average value in line with the change in the load conditions or in the control of the switches. This fluctuation needs to be brought under control in order to remain within an acceptable operating range.

The topology of FIG. 4 has three intermediate points O+, O, O− on the input converters. At these three points, three currents $I_{O+}$, $I_O$ and $I_{O-}$ are able to flow.

By processing the impact of each of these three currents, the following results are obtained:

With a non-zero current $I_{O+}$ and the supposedly zero currents $I_O$ and $I_{O-}$:

$$\Delta V_{C1} = \frac{1}{4} I_{O+} * \frac{Ts}{C}$$

$$\Delta V_{C2} = \Delta V_{C3} = \Delta V_{C4} = -\frac{1}{4}I_{O+} * \frac{Ts}{C}$$

Where:
TS represents the switching period,
C represents the capacitance of the capacitors C1, C2, C3 and C4,
$\Delta V_{Ci}$ represents the change in the voltage on the terminals of the capacitor Ci (i=1, 2, 3 or 4) over the switching period.

With a non-zero current $I_O$ and the supposedly zero currents $I_{O+}$ and $I_{O-}$:

$$\Delta V_{C1} = \Delta V_{C2} = \frac{1}{2}I_O * \frac{Ts}{C}$$

$$\Delta V_{C3} = \Delta V_{C4} = -\frac{1}{2}I_O * \frac{Ts}{C}$$

With a non-zero current $I_{O-}$ and the supposedly zero currents $I_{O+}$ and $I_O$:

$$\Delta V_{C1} = \Delta V_{C2} = \Delta V_{C3} = \frac{1}{4}I_{O-} * \frac{Ts}{C}$$

$$\Delta V_{C4} = -\frac{3}{4}I_{O-} * \frac{Ts}{C}$$

Using the principle of superposition, the overall change in the voltages on the terminals of the capacitors is obtained by summing the changes obtained in each of the possible configurations:

$$\Delta V_{C1} = \left[\frac{1}{4}I_{O+} + \frac{1}{2}I_O + \frac{1}{4}I_{O-}\right] * \frac{Ts}{C}$$

$$\Delta V_{C2} = \left[-\frac{1}{4}I_{O+} + \frac{1}{2}I_O + \frac{1}{4}I_{O-}\right] * \frac{Ts}{C}$$

$$\Delta V_{C3} = \left[-\frac{1}{4}I_{O+} - \frac{1}{2}I_O + \frac{1}{4}I_{O-}\right] * \frac{Ts}{C}$$

$$\Delta V_{C4} = \left[-\frac{1}{4}I_{O+} - \frac{1}{2}I_O - \frac{3}{4}I_{O-}\right] * \frac{Ts}{C}$$

In order to decouple the magnitudes, we can note that:
The balance for the point O+ is linked to the relationship:

$$\Delta V_{0+} = \Delta V_{C1} - \Delta V_{C2} = \frac{1}{2}I_{O+} * \frac{Ts}{C}$$

The balance of the point O− is linked to the relationship:

$$\Delta V_{O-} = \Delta V_{C3} - \Delta V_{C4} = I_{O-} * \frac{Ts}{C}$$

The balance for the point O is linked to the relationship:

$$\Delta V_O = (\Delta V_{C1} + \Delta V_{C2}) - (\Delta V_{C3} + \Delta V_{C4})$$

Or:

$$\Delta V_O = \left[\frac{I_{O+}}{2} + 2*I_O + I_{O-}\right] * \frac{Ts}{C} = \Delta V_{0+} + \Delta V_{O-} + 2*I_O * \frac{Ts}{C}$$

The table below revisits the states of the switches that prompt the presence of the currents $I_{O+}$, $I_O$, $I_{O-}$ and that therefore give rise to a change in the voltages $V_{C1}$, $V_{C2}$, $V_{C3}$, $V_{C4}$ on the terminals of the capacitors.

| State | f4U f4L | f3U f3L | f2 | f1 | Phase voltage | Io+ | Io | Io− |
|---|---|---|---|---|---|---|---|---|
| V1 | 0 | 0 | 0 | 1 | −Vdc/4 | | | |
| V2 | 0 | 0 | 1 | 0 | −Vdc/4 | | Is | |
| V4 | 0 | 1 | 0 | 0 | −Vdc/4 | | | Is |
| V3 | 0 | 0 | 1 | 1 | 0 | | Is | |
| V5 | 0 | 1 | 0 | 1 | 0 | | | Is |
| V6 | 0 | 1 | 1 | 0 | 0 | Is | | |
| V8 | 1 | 1 | 0 | 0 | 0 | | Is | |
| V7 | 0 | 1 | 1 | 1 | Vdc/4 | Is | | |
| V9 | 1 | 1 | 0 | 1 | Vdc/4 | | Is | |
| V10 | 1 | 1 | 1 | 0 | Vdc/4 | | | |

In order to ensure an output voltage with a value of −Vdc/4, the control unit chooses, in accordance with the state of charge of the capacitors of the bus, one of the states V1, V2 and V4 defined in the table above so as to obtain the current $I_O$ or $I_{O-}$.

In order to ensure a zero output voltage, the control unit chooses, in accordance with the state of charge of the capacitors of the bus, one of the states V3, V5, V6 and V7 defined in the table above so as to obtain the current $I_O$, $I_{O-}$ or $I_{O+}$.

In order to ensure an output voltage with a value of Vdc/4, the control unit chooses, in accordance with the state of charge of the capacitors of the bus, one of the states V7, V9 and V10 defined in the table above so as to obtain the current $I_O$ or $I_{O+}$.

For this first proposal, all of the possible configurations are not shown in the drawings. On the basis of FIGS. 3 to 5, these other configurations involve replacing the output converter CONV$_S$ having a flying capacitor with an output converter having an NPC, NPP or ANPC topology.

Figure 7:
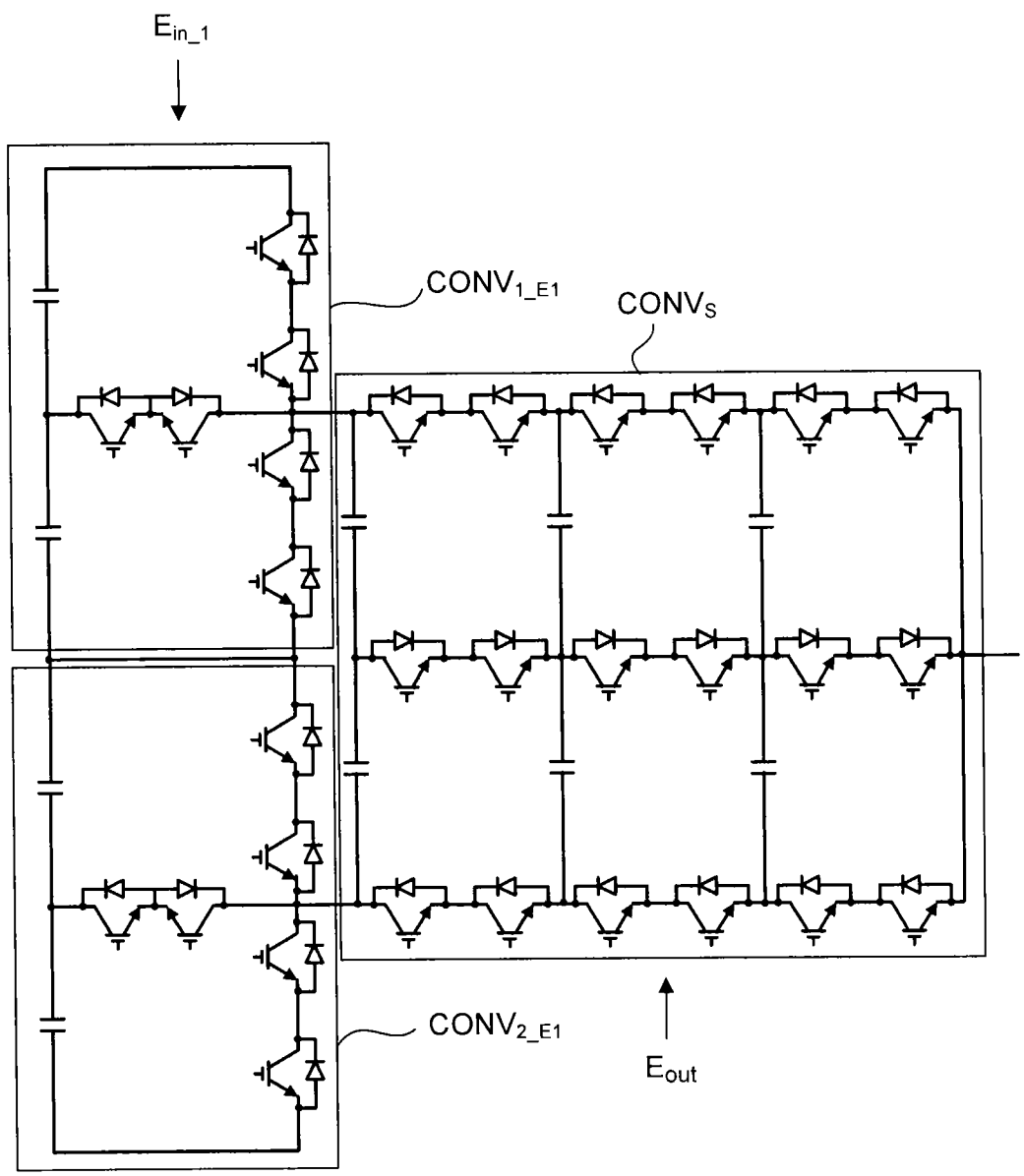
FIG. 7 shows the multilevel converter of the invention, having an input stage with NPP topology and an output stage with SMC topology.

With reference to FIG. 7, a second proposal is described below.

This second proposal involves linking an input stage E$_{in\_1}$ whose input converters CONV$_{1\_E1}$, CONV$_{2\_E1}$ use a simple topology and an output stage E$_{out}$ whose output converter CONV$_S$ exhibits a more complex topology, having a large number of switches in series.

At the input, as in the first proposal, the converters CONV$_{1\_E1}$, CONV$_{2\_E1}$ are provided in accordance with a topology of NPC, NPP or ANPC type.

At the output, the converter CONV$_S$ is provided in accordance with a topology of SMC type that allows a number of switches to be linked in series by limiting the size of the flying capacitors used.

FIG. 7 thus shows a multilevel converter exhibiting an input stage E$_{in\_1}$ whose input converters CONV$_{1\_E1}$, CONV$_{2\_E1}$ have an NPP topology and an output stage E$_{out}$ whose output converter CONV$_S$ has an SMC topology.

The other possible configurations for this second proposal, that is to say NPC+SMC and ANPC+SMC, are not shown but it should be understood that they form part of the invention.

The aim of the invention is therefore to link known basic modules in cascaded fashion so as to be able to place a suitable number of switches in series. The various architectures proposed allow adjustment to the various operating voltages, which can range from 2.3 kV to 13.8 kV.

The first proposal described above has the advantage of requiring only a small quantity of switches.

The second proposal, for its part, allows the number of switches in series to be increased, but also the type of switches to be mixed. The switches used for the input stages will preferably be of a different type than the switches used for the output stage. In order to adhere to the voltage level required for each of the components, the differential voltage applied to the input of the output converter is E/2. For the input stage, two switches must be able to withstand E/2, while the six switches of the output converter need to withstand E/2.

In the two proposals above, control as described above may be necessary in order to ensure balancing of the voltages on the terminals of the capacitors. The balancing principles apply in identical fashion to all of the topologies described in the present application.

The invention claimed is:

1. A multilevel power converter comprising:
n input stages, n being greater than or equal to 2, each input stage of rank k, k being 1 through n, having k+1 identical input converters that are connected to one another, each converter being supplied with an input voltage and controlled to apply an electrical potential to an output on the basis of said input voltage;
each input converter of the input stage of rank k−1 being supplied with a voltage resulting from the electrical potentials applied to two outputs by two converters of input stage of rank k;
an output stage connected to the input stage of rank 1 and having an output converter supplied with a differential voltage resulting from a first electrical potential applied to an output of a first input converter of the input stage of rank 1 and from a second electrical potential applied to an output of a second input converter of the input stage of rank 1, said output converter being controlled to apply an electrical potential to an output;
wherein the input converters exhibit an identical topology, chosen from among architectures of Neutral Point Clamped (NPC), Active Neutral Point Clamped (ANPC) and Neutral Point Piloted (NPP);
wherein the output converter exhibits a different topology than the topology chosen for the input converters, said topology of the output converter being chosen from among architectures of Flying Capacitor (FC), Stacked Multicell Converter (SMC), Neutral Point Clamped (NPC), Neutral Point Piloted (NPP) and Active Neutral Point Clamped (ANPC) type;
wherein the input stage of rank 1 includes only two input converters conformed by the first input converter of the input stage of rank 1 and the second input converter of the input stage of rank 1;
wherein the input stage of rank 2 includes only three input converters conformed by a first input converter of the input stage of rank 2, a second input converter of the input stage of rank 2 and a third input converter of the input stage of rank 2;
wherein the first input converter of the input stage of rank 1 is directly connected to the first and the second input converters of the input stage of rank 2, and the output converter, without any intervening converter; and
wherein the second input converter of the input stage of rank 1 is directly connected to the second and the third input converters of the input stage of rank 2, and the output converter, without any intervening converter.

2. The multilevel power converter as claimed in claim 1, wherein the input converters exhibit a topology of NPP type and in that the output converter exhibits a flying capacitor topology.

3. The multilevel power converter as claimed in claim 1, wherein the input converters exhibit a topology of NPC type and in that the output converter exhibits a flying capacitor topology.

4. The multilevel power converter as claimed in claim 1, wherein the input converters exhibit a topology of ANPC type and in that the output converter exhibits a flying capacitor topology.

5. The multilevel power converter as claimed in claim 1, wherein the input converters exhibit a topology of NPP type and in that the output converter exhibits a topology of SMC type.

6. The multilevel power converter as claimed in claim 1, wherein the input converters exhibit a topology of NPC type and in that the output converter exhibits a topology of SMC type.

7. The multilevel power converter as claimed in claim 1, wherein that the input converters exhibit a topology of ANPC type and in that the output converter exhibits a topology of SMC type.

* * * * *